United States Patent
Gumeci et al.

(10) Patent No.: US 10,381,652 B2
(45) Date of Patent: Aug. 13, 2019

(54) FUEL CELL ELECTRODE HAVING INCREASED OXYGEN CONCENTRATION AND METHODS OF PREPARING ELECTRODE

(71) Applicant: Nissan North America, Inc., Franklin, TN (US)

(72) Inventors: Cenk Gumeci, Walled Lake, MI (US); Amod Kumar, Novi, MI (US); Nilesh Dale, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 263 days.

(21) Appl. No.: 15/452,177

(22) Filed: Mar. 7, 2017

(65) Prior Publication Data
US 2018/0261852 A1    Sep. 13, 2018

(51) Int. Cl.
| | |
|---|---|
| *H01M 4/86* | (2006.01) |
| *H01M 4/88* | (2006.01) |
| *H01M 8/1004* | (2016.01) |
| *H01M 4/92* | (2006.01) |

(52) U.S. Cl.
CPC ....... *H01M 4/8663* (2013.01); *H01M 4/8828* (2013.01); *H01M 4/92* (2013.01); *H01M 8/1004* (2013.01)

(58) Field of Classification Search
None
See application file for complete search history.

(56) References Cited

U.S. PATENT DOCUMENTS

| | | | |
|---|---|---|---|
| 8,354,137 B2 | 1/2013 | Morioka et al. | |
| 2003/0087141 A1* | 5/2003 | Sun | B82Y 5/00 429/401 |
| 2007/0231674 A1* | 10/2007 | Shelnutt | B82Y 30/00 429/483 |
| 2011/0003071 A1 | 1/2011 | Uensal et al. | |
| 2011/0253643 A1* | 10/2011 | Polshettiwar | B01J 23/02 210/749 |
| 2015/0147678 A1 | 5/2015 | Kihira et al. | |

FOREIGN PATENT DOCUMENTS

EP    3075469 A1    10/2016

OTHER PUBLICATIONS

David P. Hickey, Krysti L. Knoche, Kelan Albertson, Carolina Castro, Ross D. Milton and Shelley D. Minteer, Improving O2 reduction at an enzymatic biocathode: mimicking the lungs, Chem. Commun., 2016, 52, 13299 DOI: 10.1039/c6cc07215a (Year: 2016).*

* cited by examiner

*Primary Examiner* — Maria Laios
(74) *Attorney, Agent, or Firm* — Young Basile Hanlon & MacFarlane, P.C.

(57) ABSTRACT

A membrane electrode assembly includes a membrane, a gas diffusion layer and a catalyst layer between the membrane and the gas diffusion layer. The catalyst layer comprises catalyst comprising active catalyst particles supported on support particles, a proton conducting ionomer and a phospholipid containing soluble oxygen. One method of preparation includes preparing a catalyst solution comprising a solvent and catalyst, adding proton conducting ionomer to the catalyst solution to form a catalyst ink, saturating a solution of solvent and a phospholipid with oxygen and mixing the saturated phospholipid with the catalyst ink.

20 Claims, 4 Drawing Sheets

FUEL CELL ELECTRODE HAVING INCREASED OXYGEN CONCENTRATION AND METHODS OF PREPARING ELECTRODE

TECHNICAL FIELD

This disclosure relates to fuel cell electrodes having improved oxygen transport and methods of making the fuel cell electrodes. In particular, the electrodes include a phospholipid having soluble oxygen to improve oxygen transport to active catalyst material.

BACKGROUND

Fuel cells efficiently and electrochemically convert fuel into electric current, which may then be used to power electric circuits, such as drive systems for vehicles. A fuel cell containing a proton exchange membrane is an electrochemical device that converts chemical energy to electrical energy using, for example, hydrogen or methane as fuel and oxygen/air as oxidant.

Fuel cells have membrane electrode assemblies comprising a membrane with an anode on one side and a cathode on the other side. On the anode side, the catalyst enables hydrogen molecules to be split into protons and electrons. On the cathode side, the catalyst enables oxygen reduction by reacting with the protons generated by the anode, producing water. Due to pressure to reduce cost of fuel cells, amounts of active catalyst material such as platinum have been reduced while balancing fuel cell efficiency. Poor oxygen transport to the active catalyst particles impacts the efficiency of the fuel cell.

SUMMARY

Disclosed herein are implementations of fuel cell electrodes having increased oxygen concentration in the catalyst layer.

One embodiment of a membrane electrode assembly for a fuel cell includes a membrane, a gas diffusion layer and a catalyst layer between the membrane and the gas diffusion layer. The catalyst layer comprises catalyst particles comprising active catalyst particles supported on support particles, a proton conducting ionomer and a phospholipid containing soluble oxygen.

Also disclosed are methods of preparing the membrane electrode assemblies for a fuel cell. One method of preparation includes preparing a catalyst solution comprising a solvent and catalyst, adding proton conducting ionomer to the catalyst solution to form a catalyst ink, saturating a solution of solvent and a phospholipid with oxygen and mixing the saturated phospholipid with the catalyst ink.

Another method of preparing a membrane electrode assembly for a fuel cell includes preparing a catalyst solution comprising a solvent and catalyst, saturating a solution of solvent and a phospholipid with oxygen, mixing proton conducting ionomer to the saturated phospholipid, depositing a catalyst solution comprising a solvent and catalyst on one of a membrane and a gas diffusion layer and depositing the mixture of proton conducting ionomer and the saturated phospholipid on the deposited catalyst solution.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
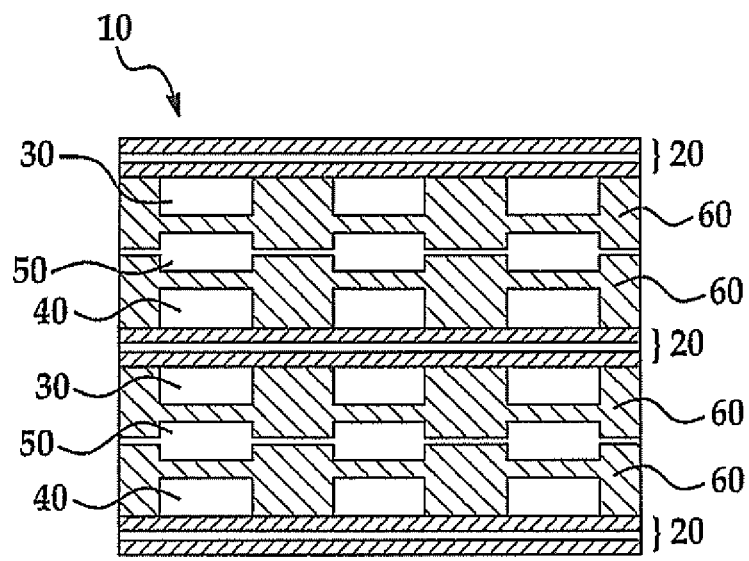
FIG. 1 is a schematic of a cross-section of a fuel cell stack.

FIG. 1 shows a schematic cross-sectional illustration of a portion of a fuel cell stack 10. The illustration is provided as an example and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
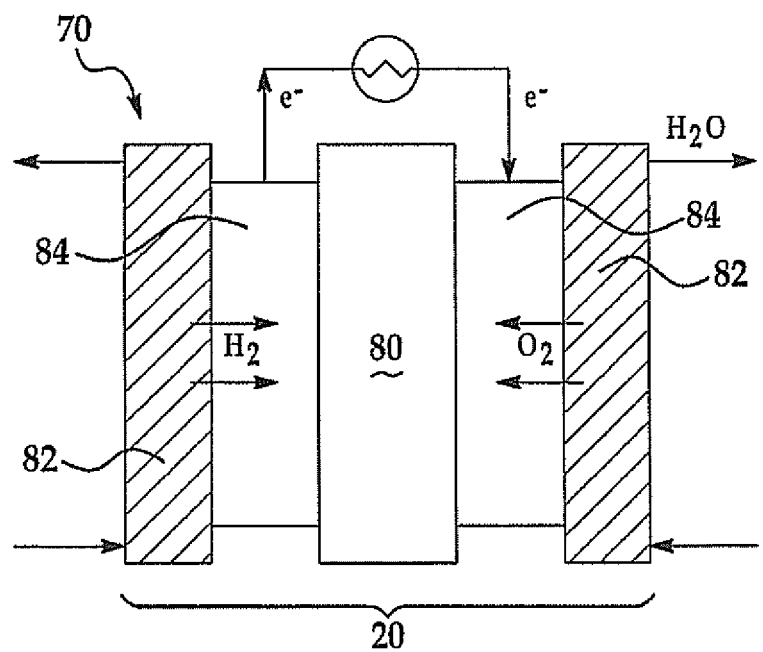
FIG. 2 is a schematic of a membrane electrode assembly.

FIG. 2 is an illustration of one of the plurality of fuel cells 70 in the fuel cell stack 10. The fuel cell 70 is comprised of a single membrane electrode assembly 20. The membrane 80 has a catalyst layer 84 formed on opposing surfaces of the membrane 80, such that when assembled, the catalyst layers 84 are each between the membrane 80 and a gas diffusion layer 82. Alternatively, a gas diffusion electrode is made by forming a catalyst layer 84 on a surface of each of two gas diffusion layers 82 and sandwiching the membrane 80 between the gas diffusion layers 82 such that the catalyst layers 84 contact the membrane 80.

Fuel cell catalyst typically comprises a support material such as carbon or another conductive material, with an active catalyst material supported on the support material. The active catalyst material can be platinum or other noble metals, transition metals, metal oxides, or alloys or a combination thereof. Non-limiting examples of active catalyst material include Pt, Pt—Co, Pt—Ni, Pt—Cu and Pt—Fe. The catalyst is typically mixed with an ionomer and sprayed or otherwise layered on one of the membrane 80 and the gas diffusion layer 82 to form the catalyst layer 84. Due in part to the cost of the active catalyst material, as little as possible is used to achieve the requisite fuel cell performance. Oxygen in the oxidant 40 is required at the site of the active catalyst material for the reduction reaction.

To increase oxygen concentration in the catalyst layer, the membrane electrode assemblies disclosed herein incorporate material having high oxygen solubility into the catalyst layer. These materials lower the oxygen transport resistance and improve fuel cell performance, particularly at high current densities. The material can be saturated with oxygen prior to addition into the catalyst layer. However, pre-saturation is not necessary as oxygen coming into the catalyst layer in the oxidant during use will be readily solubilized in the material. As used herein, "high oxygen solubility" refers to oxygen solubility greater than conventional ionomers, such as perfluorosulfonic acid (PFSA), that are currently used in catalyst ink for fuel cells. Oxygen solubility is dependent on at least pressure, temperature and humidity, so the oxygen solubility of the materials having high oxygen solubility at one pressure and temperature is greater than the oxygen solubility of PFSA at that same pressure and temperature. As a non-limiting example, Nafion™ ionomer has an oxygen solubility of about 10-11 mmol/liter at 80° C. and 1 atm. The oxygen solubility of the material having high oxygen solubility can be greater than 12 mmol/liter and up to about 50 mmol/liter at 80° C. and 1 atm.

Figure 3:
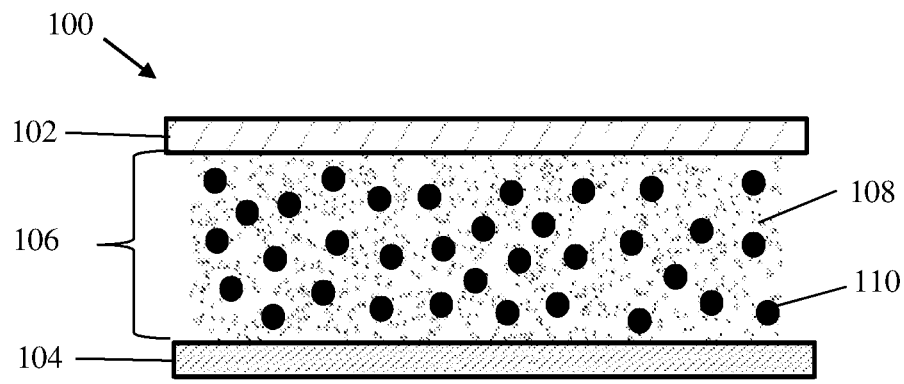
FIG. 3 is a schematic of a membrane electrode assembly as disclosed herein.

One embodiment of a membrane electrode assembly 100 for a fuel cell is illustrated in FIG. 3 and includes a membrane 102, a gas diffusion layer 104 and a catalyst layer 106 between the membrane 102 and the gas diffusion layer 104. The catalyst layer 106 comprises catalyst 108 comprising active catalyst particles supported on support particles, a proton conducting ionomer and a phospholipid 110 as the material having high oxygen solubility.

The phospholipid in the catalyst layer traps and stores oxygen, allowing enhanced localized oxygen concentration at the active catalyst particles. Oxygen is required at the cathode for the reduction reaction. High oxygen concentrations assist fuel cells with low loading of active catalyst particles at higher current densities. The phospholipid also acts as a surfactant to assist dispersion of the catalyst throughout the catalyst layer. Some phospholipids will also conduct protons, but the conductivity of the phospholipids is lower than the ionomer used in the catalyst layer. Therefore, ionomer is used in the catalyst layer along with the phospholipid to provide the requisite proton conduction.

The phospholipid can be a phosphocholine. Phophocholine has the following chemical structure:

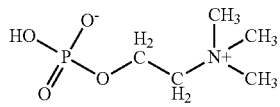

The phosphocholine can be one of 1,2-dilauroyl-sn-glycero-3-phosphocholine, 1,2-dimyristoyl-sn-glycero-3-phosphocholine, 1,2-Dipalmitoyl-sn-glycero-3-phosphocholine, 1,2-Distearoyl-sn-glycero-3-phosphocholine, and 1,2-Dioleoyl-sn-glycero-3-phosphocholine and mixtures thereof. The phosphocholine can also be one or more of the following:
1,2-Dipalmitoyl-rac-glycero-3-phosphocholine
1,2-Dierucoyl-sn-glycero-3-phosphocholine
1,2-Dimyristoyl-rac-glycero-3-phosphocholine
1,2-Distearoyl-sn-glycero-3-phosphocholine
1-Palmitoyl-sn-glycero-3-phosphocholine
1-Oleoyl-sn-glycero-3-phosphocholine
1-Stearoyl-sn-glycero-3-phosphocholine
1,2-Diarachidoyl-sn-glycero-3-phosphocholine
1-O-Palmityl-sn-glycero-3-phosphocholine
1,2-Didodecanoyl-sn-glycero-3-phosphocholine
1,2-Dilinoleoyl-sn-glycero-3-phosphocholine
1,2-Didecanoyl-sn-glycero-3-phosphocholine
1,2-Didodecanoyl-rac-glycero-3-phosphocholine
1,2-Dihexanoyl-sn-glycero-3-phosphocholine
1-Dodecanoyl-sn-glycero-3-phosphocholine
2,3-Dipalmitoyl-sn-glycero-1-phosphocholine
1,2-Dieicosapentaenoyl-sn-glycero-3-phosphocholine
1,2-Dihexadecyl-rac-glycero-3-phosphocholine
1,2-Dipentadecanoyl-sn-glycero-3-phosphocholine
1,2-Didocosanoyl-sn-glycero-3-phosphocholine
1,2-Dielaidoyl-sn-glycero-3-phosphocholine
1-O-Palmityl-rac-glycero-3-phosphocholine
1,2-Dimyristoyl-rac-glycero-3-phosphocholine-$d_{72}$ hydrate
1,2-Dinonanoyl-sn-glycero-3-phosphocholine The phospholipid can be saturated with oxygen prior to adding to the catalyst layer to immediately provide additional oxygen to the active catalyst particles in addition to that provided by the oxidant. Alternatively, the phospholipid can be added without saturation, the phospholipid trapping and storing oxygen from the oxidant.

The amount of phospholipid used in the catalyst layer will depend on the amount of active catalyst used. The ratio of the weight percent of active catalyst particles to the weight percent of phospholipid is greater than or equal to 0.2 and less than or equal to 0.4. The ratio of weight percent phospholipid to weight percent ionomer I the catalyst layer is greater than or equal to 0.2 and less than or equal to 0.6.

The amount of ionomer used in the catalyst layer is typically dependent on the amount of catalyst used. However, because the weight of the support particles is significantly greater than the weight of the active catalyst particles, the amount of ionomer can be dependent on the amount of support particles in the catalyst layer. For the embodiments herein, the ratio of the proton conducting ionomer plus the phospholipid, by weight, to the support particles by weight is greater than or equal to 0.6 and less than or equal to 1.2.

As a non-limiting example of a catalyst ink recipe, in terms of weight percent, 20% catalyst (Pt or Pt alloys) is dispersed on carbon support. One gram of catalyst dispersed on carbon contains 20% catalyst and 80% carbon. From Equations 1-3, one can calculate the amount (and percentage of) phospholipids and ionomer ranges:

$$\text{Equation 1} = 0.2 \leq \frac{\text{Catalyst}}{\text{Phospholipids}} \leq 0.4$$

$$\text{Equation 2} = 0.2 \leq \frac{\text{Phospholipids}}{\text{Ionomer}} \leq 0.6$$

$$\text{Equation 3} = 0.6 \leq \frac{\text{Ionomer} + \text{Phospholipids}}{\text{Support}} \leq 1.2$$

As noted, the phospholipid may provide some proton conduction, but typically has a lower conductivity than the ionomer used in the catalyst layer. Proton conduction happens at the phospholipid-water interface due to interfacial water and its associated hydrogen bond network. However, proton conduction by the phospholipid can be improved by surface modification with a functional group. When a functionalized phospholipid is used in the catalyst layer, less ionomer is required to meet the requisite proton conduction. The ratio of a functionalized hydrogen conducting phospholipid by weight to ionomer by weight is adjusted to greater than or equal to 0.5 and less than or equal to 1.0.

The phospholipid can be modified, for example, with polyethylene glycol (PEG). The PEG lipids are immobilized onto the surface of the phospholipid vesicles by adding an aqueous dispersion of the PEG lipids to the vesicle dispersion. To prevent dissociation of the PEG lipids, PEGS with at least two and four acyl chains are used with a molecular weight of about 5000 and 12,500, respectively.

The phospholipid can also be modified with the addition of protein aromatics. For example, one or more fluorinated aromatic amino acids can be incorporated. Fluorinated aromatic amino acids destabilize the cation-$\pi$ interactions by altering electrostatics of the aromatic ring while their increased hydrophobicity enhances membrane insertion.

Non-limiting examples of the fluorinated aromatic amino acids include pentafluorophenylalanine and difluorotyrosine.

The phospholipid can also be modified with a fatty acid bound on a polar head of the phospholipid with an ether linkage. The fatty acid bound with an either rather than an ester linkage provide intercalated water molecules hydrogen bonded to the carboxyl group. Non-limiting examples of the fatty acids are lauric acid, myristic acid, palmitic acid, oleic acid and phytanic acid.

Figure 4:
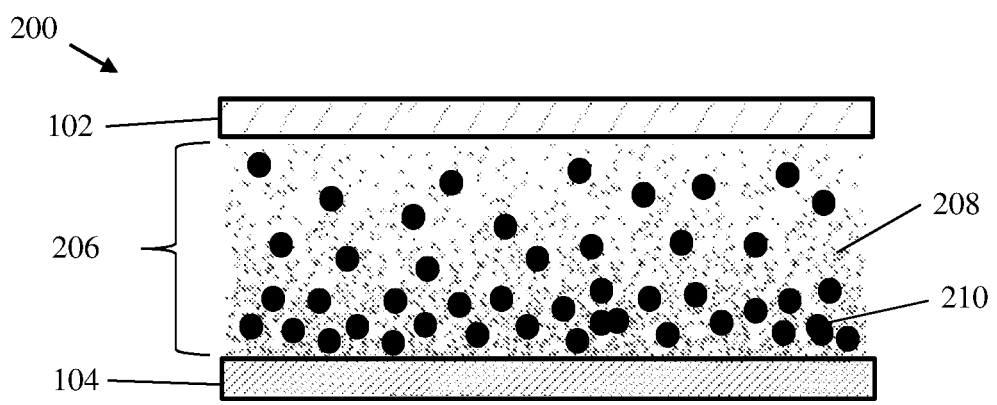
FIG. 4 is a schematic of another membrane electrode assembly as disclosed herein.

To further increase the oxygen concentration at the active catalyst particles, the catalyst layer 206 can have an active catalyst particle gradient such that a concentration of catalyst 208 is greatest toward the gas diffusion layer 104 and lowest toward the membrane 100, as illustrated in the membrane electrode assembly 200 in FIG. 4. The oxidant enters through the gas diffusion layer, so having an increased concentration of active catalyst particles near the gas diffusion layer improves cathode performance. Accordingly, the catalyst layer can also have a phospholipid gradient such that a concentration of the phospholipid 210 is greatest toward the gas diffusion layer 104 and lowest toward the membrane 102. Alternative to a true gradient, two or more layers can be used, with the layer closest to the gas diffusion layer having the highest concentration of both catalyst and phospholipid, and the layer closest to the membrane having the highest concentration of ionomer. As a non-limiting example, two layers can be used, with the layer closest to the gas diffusion layer being about 4 microns in thickness and the layer closest to the membrane being about 10 microns in thickness.

Figure 5:
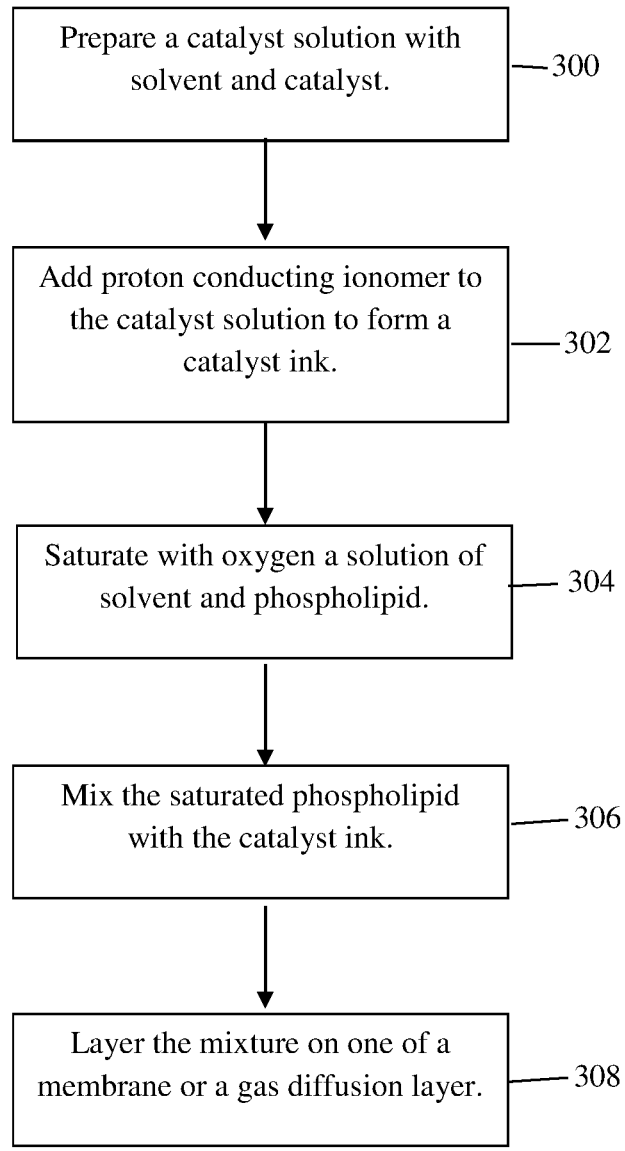
FIG. 5 is a flow diagram of a method of making a membrane electrode assembly as disclosed herein.

Methods of preparing the membrane electrode assemblies are also disclosed. One method of preparation, shown in FIG. 5, includes preparing a catalyst solution comprising a solvent and catalyst (300), and adding the proton conducting ionomer to the catalyst solution to form a catalyst ink (302). A solution of solvent and a phospholipid is saturated with oxygen (304) and is then mixed with the catalyst ink (306). Saturating the phospholipid can be done by bubbling gas containing oxygen through the solution for a period of time, such as two hours or more, as a non-limiting example. The mixed catalyst ink and saturated phospholipid are layered onto one of a membrane and a gas diffusion layer (308). The layering can occur using using traditional deposition via a spray system such as an automated robotic system or an air brush. Phospholipids typically are high molecular weight molecules, so electrospinning can be used for the deposition of the catalyst layer. Electrospinning can result in phospholipids with a fiber-like structure, which enhances oxygen transport. Electrospraying can also be used, providing a more uniform layer than traditional deposition.

Figure 6:
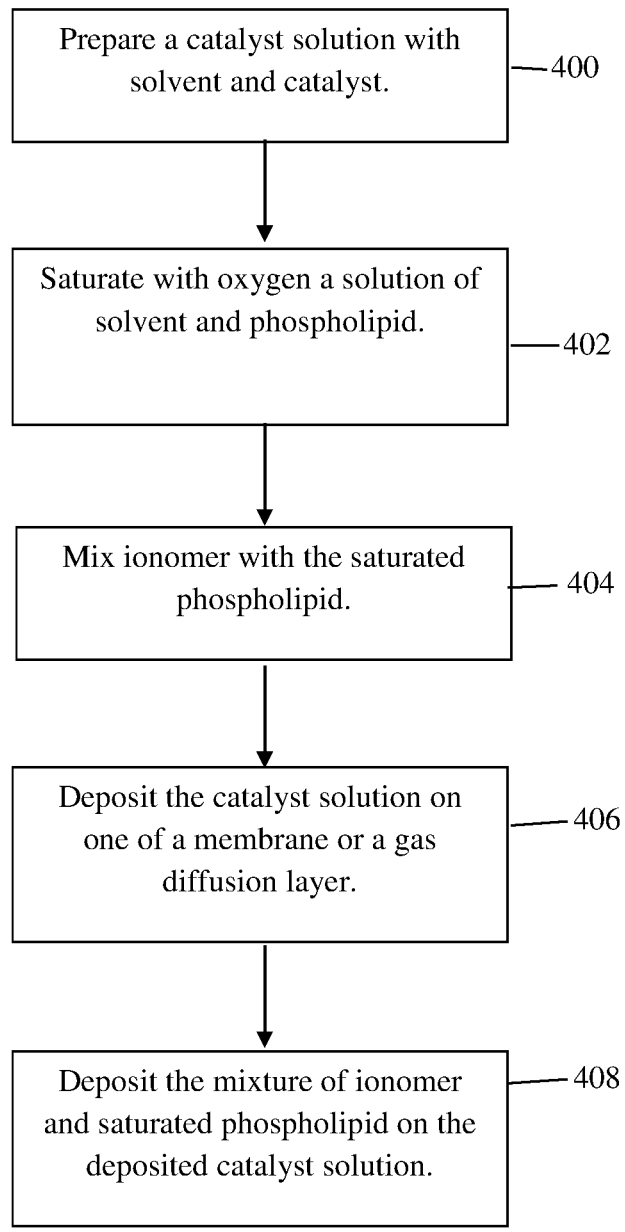
FIG. 6 is a flow diagram of another method of making a membrane electrode assembly as disclosed herein.

As shown in FIG. 6, another method of preparing a membrane electrode assembly for a fuel cell includes preparing a catalyst solution comprising a solvent and catalyst (400), saturating a solution of solvent and a phospholipid with oxygen (402), mixing proton conducting ionomer with the saturated phospholipid (404), depositing the catalyst solution comprising the solvent and catalyst on one of a membrane and a gas diffusion layer (406) and depositing the mixture of proton conducting ionomer and the saturated phospholipid on the deposited catalyst solution (408).

The depositing can be performed using the same methods disclosed or a different method can be used for each layer. The solvent can be water or any other solvent known by those skilled in the art. If a modified phospholipid is used, the modification or functionalization will occur prior to saturating the phospholipid.

Alternative to the phospholipid or in addition to phospholipids, an ionic liquid can be used. Examples of ionic liquids having high oxygen solubility that can be used in the membrane electrode assemblies disclosed herein include, but are not limited to, fluoroalkyl sulfonic acids with different chain lengths. Non-limiting examples of fluoroalkyl sulfonic acids include:

1-ethyl-3-methylimidazolium bis(trifluoromethane sulfonyl)imide

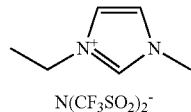

$N(CF_3SO_2)_2^-$ 1-ethyl-3-methylimidazolium trifluoromethanesulfonate

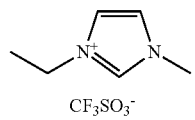

$CF_3SO_3^-$

N,N-diethylmethylamine trifluoromethanesulfonate

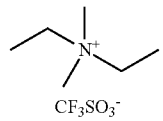

$CF_3SO_3^-$

The ionic liquids can be used in the catalyst layers disclosed herein in place of the phospholipids or in addition to the phospholipids. In addition, the catalyst layer can have an ionic liquid gradient such that a concentration of ionic liquid is greatest toward the gas diffusion layer and lowest toward the membrane to further increase the oxygen concentration near the active catalyst particles.

For simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A membrane electrode assembly, comprising:
    a membrane;
    a gas diffusion layer; and
    a catalyst layer between the membrane and the gas diffusion layer, the catalyst layer comprising:
        catalyst comprising active catalyst particles supported on support particles;
        a proton conducting ionomer; and
        a phospholipid containing soluble oxygen.

2. The membrane electrode assembly of claim 1, wherein the phospholipid is a phosphocholine.

3. The membrane electrode assembly of claim 2, wherein the phosphocholine is one of 1,2-dilauroyl-sn-glycero-3-phosphocholine, 1,2-dimyristoyl-sn-glycero-3-phosphocholine, 1,2-Dipalmitoyl-sn-glycero-3-phosphocholine, 1,2-Distearoyl-sn-glycero-3-phosphocholine, and 1,2-Dioleoyl-sn-glycero-3-phosphocholine and mixtures thereof.

4. The membrane electrode assembly of claim 1, wherein the active catalyst particles are platinum, and a weight ratio of active catalyst particles to the phospholipid is greater than or equal to 0.2 and less than or equal to 0.4.

5. The membrane electrode assembly of claim 1, wherein a weight ratio of the proton conducting ionomer with the phospholipid to the support particles is greater than or equal to 0.6 and less than or equal to 1.2.

6. The membrane electrode assembly of claim 1, wherein a weight ratio of phospholipid to ionomer is greater than or equal to 0.2 and less than or equal to 0.6.

7. The membrane electrode assembly of claim 1, wherein the phospholipid is also a hydrogen conducting phospholipid, a weight ratio of hydrogen conducting phospholipid to ionomer being greater than or equal to 0.5 and less than or equal to 1.0.

8. The membrane electrode assembly of claim 7, wherein the hydrogen conducting phospholipid is a polyethylene glycol modified phospholipid.

9. The membrane electrode assembly of claim 7, wherein the hydrogen conducting phospholipid is a phospholipid into which a fluorinated aromatic amino acid is incorporated.

10. The membrane electrode assembly of claim 9, wherein the fluorinated aromatic amino acid is one of pentafluorophenylalanine and difluorotyrosine.

11. The membrane electrode assembly of claim 7, wherein the hydrogen conducting phospholipid is a phospholipid with a fatty acid bound on a polar head of the phospholipid with an ether linkage.

12. The membrane electrode assembly of claim 11, wherein the fatty acid is one or more of lauric acid, myristic acid, palmitic acid, oleic acid and phytanic acid.

13. The membrane electrode assembly of claim 1, wherein the catalyst layer has an active catalyst particle gradient such that a concentration of active catalyst particles is greatest toward the gas diffusion layer and lowest toward the membrane.

14. The membrane electrode assembly of claim 13, wherein the catalyst layer has a phospholipid gradient such that a concentration of the phospholipid is greatest toward the gas diffusion layer and lowest toward the membrane.

15. A method of preparing a membrane electrode assembly, comprising:
    preparing a catalyst solution comprising a solvent and catalyst;
    adding proton conducting ionomer to the catalyst solution to form a catalyst ink;
    saturating a solution of solvent and a phospholipid with oxygen;
    mixing the saturated phospholipid with the catalyst ink.

16. The method of claim 15, wherein the saturating comprises bubbling gas containing oxygen through the solution for at least two hours.

17. The method of claim 15, further comprising layering the mixed catalyst ink and saturated phospholipid onto one of a membrane and a gas diffusion layer using either electrospinning or electrospraying.

18. The method of claim 15, wherein the phospholipid is one of 1,2-dilauroyl-sn-glycero-3-phosphocholine, 1,2-dimyristoyl-sn-glycero-3-phosphocholine, 1,2-Dipalmitoyl-sn-glycero-3-phosphocholine, 1,2-Distearoyl-sn-glycero-3-phosphocholine, and 1,2-Dioleoyl-sn-glycero-3-phosphocholine and mixtures thereof.

19. The method of claim 15, wherein the active catalyst particles are platinum, and a weight ratio of active catalyst particles to the phospholipid is greater than or equal to 0.2 and less than or equal to 0.4.

20. A method of preparing a membrane electrode assembly, comprising:
    preparing a catalyst solution comprising a solvent and catalyst;
    saturating a solution of solvent and a phospholipid with oxygen;
    mixing proton conducting ionomer to the saturated phospholipid;
    depositing a catalyst solution comprising the solvent and the catalyst on one of a membrane and a gas diffusion layer; and
    depositing the mixture of proton conducting ionomer and the saturated phospholipid on the deposited catalyst solution.

* * * * *